United States Patent [19]

Cohen

[11] Patent Number: 5,729,766
[45] Date of Patent: Mar. 17, 1998

[54] SYSTEM FOR MEMORY UNIT RECEIVING PSEUDO-RANDOM DELAY SIGNAL OPERATIVE TO ACCESS MEMORY AFTER DELAY AND ADDITIONAL DELAY SIGNAL EXTENDING FROM TERMINATION OF MEMORY ACCESS

[75] Inventor: Michael Cohen, Jersusalem, Israel

[73] Assignee: Softchip Israel Ltd., Israel

[21] Appl. No.: 496,351

[22] Filed: Jun. 30, 1995

[30] Foreign Application Priority Data

Jun. 30, 1994 [IL] Israel ............................. 110181

[51] Int. Cl.$^6$ ............................. G06F 13/00
[52] U.S. Cl. ............. 395/878; 395/800; 395/552; 395/556; 395/559; 364/232.8; 364/270
[58] Field of Search ............... 395/427, 550, 395/800, 821; 364/232.8, 270

[56] References Cited

U.S. PATENT DOCUMENTS

| 3,422,404 | 1/1969 | Ferguson | 395/385 |
|---|---|---|---|
| 4,399,435 | 8/1983 | Urabe | 345/25 |
| 4,584,665 | 4/1986 | Vrielink | 395/185.04 |
| 4,661,902 | 4/1987 | Hochsprung et al. | 395/800 |
| 4,785,416 | 11/1988 | Stringer | 395/500 |
| 4,827,476 | 5/1989 | Garcia | 371/22.3 |
| 4,851,995 | 7/1989 | Hsu et al. | 395/555 |
| 4,947,411 | 8/1990 | Taketora et al. | 377/47 |
| 5,115,503 | 5/1992 | Durkin | 395/556 |
| 5,125,083 | 6/1992 | Fite et al. | 395/383 |

(List continued on next page.)

FOREIGN PATENT DOCUMENTS

| 167853 | 1/1986 | European Pat. Off. . |
|---|---|---|
| 196964 | 10/1986 | European Pat. Off. . |
| 199173 | 10/1986 | European Pat. Off. . |
| 314277 | 5/1989 | European Pat. Off. . |
| 339224 | 11/1989 | European Pat. Off. . |
| 357250 | 3/1990 | European Pat. Off. . |
| 385567 | 9/1990 | European Pat. Off. . |
| 407268 | 1/1991 | European Pat. Off. . |
| 2667715 | 10/1992 | France . |
| WO 92/10032 | 6/1992 | WIPO . |

OTHER PUBLICATIONS

DS80C320 High–Speed Micro, Dallas Semiconductor.
NEC Electronics Inc. Preliminary Information, V30 PD70116 High–Performance 16–Bit Microprocessor, May 1985, pp. 1–43.
IBM Technical Disclosure Bulletin, vol. 19, No. 12, May 1977, Armonk, US, p. 4529 XP002023744; Lang, et al., "Fault–tolerant Branch on Value Instruction".

(List continued on next page.)

*Primary Examiner*—Thomas C. Lee
*Assistant Examiner*—Anderson I. Chen
*Attorney, Agent, or Firm*—Welsh & Katz, Ltd.

[57] ABSTRACT

This invention discloses a microprocessor device comprising an execution unit which is governed by a master clock signal and a repeatedly programmable master clock divider which is operative to divide the master clock signal. The microprocessor device is operative to execute instructions executed by an existing microprocessor, wherein said instructions being executed in a given number of machine cycles. Furthermore, the microprocessor includes a programmable instruction mapper containing a multiplicity of mapping schemes for controlling the microprocessor apparatus. A tamper-resistant execution device is included operative to execute instructions arriving from an instruction register. The microprocessor device also includes a pseudo-random access delay signal generator which generates a signal for determining the number of clock cycles elapsing from a memory access instruction cycle to actual memory access. Additionally, a method is also included for testing the contents and integrity of a condition signal within a single machine cycle.

7 Claims, 9 Drawing Sheets

U.S. PATENT DOCUMENTS

| | | | |
|---|---|---|---|
| 5,274,796 | 12/1993 | Conner | 395/557 |
| 5,276,856 | 1/1994 | Norsworthy et al. | 395/555 |
| 5,301,306 | 4/1994 | Plog | 395/556 |
| 5,301,356 | 4/1994 | Bodin et al. | 455/436 |
| 5,309,561 | 5/1994 | Overhouse et al. | 395/200.19 |
| 5,311,483 | 5/1994 | Takasugi | 365/233 |
| 5,325,430 | 6/1994 | Smyth et al. | 380/4 |
| 5,329,467 | 7/1994 | Nagamune et al. | 364/561 |
| 5,428,746 | 6/1995 | Dalrymple | 395/306 |

OTHER PUBLICATIONS

New Electronics. Incorporating electronics Today, vol. 21, No. 3, Mar. 1988, London, UK, pp. 47–48, 50, XP000005612; Sweetman D: "Preventing Malfunctions of Microprocessor–Based Equipment".

Proceedings of the Nat'l Aerospace & Electronics Conf. (NAECON), Dayton, May 24–28, 1993, vol. 1 of 2, 24 May 1993, Institute of Electrical & Electronics Engineers, pp. 129–136, XP00041941; Finley, et al., "Realtime Avionics Processor Emulators".

NOTE: EXPECTED STATE MAY BE "0" OR "1" OR "DONT CARE"

FIG. 8A
PRIOR ART
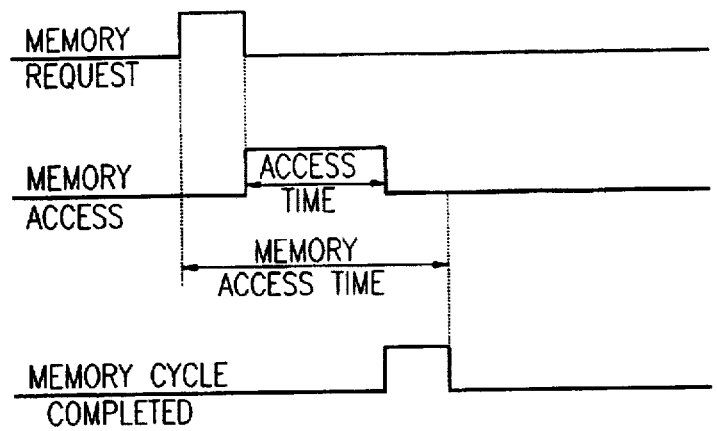
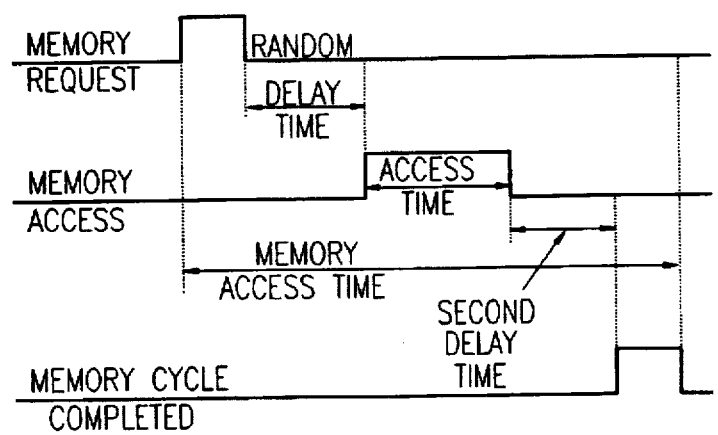
FIG. 8B

SYSTEM FOR MEMORY UNIT RECEIVING PSEUDO-RANDOM DELAY SIGNAL OPERATIVE TO ACCESS MEMORY AFTER DELAY AND ADDITIONAL DELAY SIGNAL EXTENDING FROM TERMINATION OF MEMORY ACCESS

FIELD OF THE INVENTION

The present invention relates to microprocessors.

BACKGROUND OF THE INVENTION

The datasheet of the DS80C320 High Speed Micro, commercially available from Dallas Semiconductor, states that the DS80C320 has a stretch memory cycle feature which (p. 9) "allows the application software to adjust the speed of data memory access. The micro is capable of performing the MOVX in as little as two instruction cycles. However, this value can be stretched as needed so that both fast memory and slow memory or peripherals can be accessed with no glue logic".

However, the stretch memory cycle feature still does not provide timing compatibility of the DS80C320 to existing devices such as the Intel 80C32 device, as specifically stated on p. 4 of the data sheet: "The exception is critical timing since the High Speed Micro performs its instructions much faster than the original."

Published French Patent Application No. 2667715 (90 12440) describes a card which receives data or commands and transmits an "end of command" or "reception acknowledgement" signal after a time T of random duration which does not indicate the type of command performed by the card.

SUMMARY OF THE INVENTION

It is an object of the present invention to provide a microprocessor which is an optimized and faster version of an existing microprocessor and which is selectably timing compatible therewith.

It is also an object of the present invention to provide a method for causing a first microprocessor which is optimized and faster than a second microprocessor to become timing compatible with the second microprocessor.

There is thus provided, in accordance with a preferred embodiment of the present invention, a microprocessor device including an execution unit which is governed by a master clock signal, and a repeatedly programmable master clock divider which is operative to divide the master clock signal.

Also provided, in accordance with another preferred embodiment of the present invention, is a microprocessor device operative to execute the instructions $I_1, \ldots, I_k$ executed by an existing microprocessor, the instructions being executed by the existing microprocessor in $n_1, \ldots, n_k$ machine cycles respectively, the microprocessor device including an execution unit operative to execute the plurality of instructions in $m_1, \ldots, m_k$ machine cycles respectively, where $m_i <= n_i$ for $i=1, \ldots, k$, and a machine cycle controller operative in response to a "select microprocessor" signal, to waste machine cycles such that, for each instruction, the same number of machine cycles are expended by the execution unit as by the existing microprocessor.

Further in accordance with a preferred embodiment of the present invention, the programmable master clock divider is one-time programmable.

Still further in accordance with a preferred embodiment of the present invention, the programmable master clock divider is execution-time programmable.

Additionally in accordance with a preferred embodiment of the present invention, the machine cycle controller is one-time programmable.

Further in accordance with a preferred embodiment of the present invention, the machine cycle controller is execution-time programmable.

Still further in accordance with a preferred embodiment of the present invention, the execution unit includes a state machine.

Additionally in accordance with a preferred embodiment of the present invention, the execution unit includes a microcode controller and associated microcode.

Further in accordance with a preferred embodiment of the present invention, the machine cycle controller is operative to instruct the execution unit to remain in its current state until the same number of machine cycles have been expended as by the existing microprocessor.

Still further in accordance with a preferred embodiment of the present invention, the device also includes a clock gate and the machine cycle controller is operative to instruct the clock gate to block the clock to the execution unit.

There is also provided, in accordance with another preferred embodiment of the present invention, microprocessor control apparatus including an instruction register receiving an individual one of a plurality of instruction codes, an intrinsic instruction execution unit containing a plurality of intrinsic instruction functions and an input, the unit being operative to receive a control signal through the input which designates an individual one of the intrinsic instruction functions and to execute the designated intrinsic instruction function, and a programmable instruction mapper containing a multiplicity of mapping schemes and being operative to employ a selected scheme to convert the instruction code in the register into an intrinsic instruction designation which is provided as a control signal to the input of the execution unit.

Further in accordance with a preferred embodiment of the present invention, the control signal is stored in a register which is loaded by a specific instruction performed by the execution unit.

Still further in accordance with a preferred embodiment of the present invention, the control signal is stored in a register which is mapped as a memory location such that the control signal is introduced therein by writing.

Further in accordance with a preferred embodiment of the present invention, the control signal is stored in a non-volatile register which is loaded by programming.

Still further in accordance with a preferred embodiment of the present invention, the apparatus includes a volatile register storing the control signal, and a non-volatile register storing a default value which is copied into the volatile register Further in accordance with a preferred embodiment of the present invention, the apparatus also includes a register containing a control signal for the clock divider, wherein the register is loaded by a specific instruction performed by the execution unit.

Still further in accordance with a preferred embodiment of the present invention, the apparatus also includes a register containing a control signal for the clock divider, wherein the register is mapped as a memory location such that the control signal is introduced therein by writing.

Further in accordance with a preferred embodiment of the present invention, the apparatus also includes a non-volatile register which contains a control signal for the clock divider and which is loaded by programming.

Still further in accordance with a preferred embodiment of the present invention, the apparatus also includes a volatile register storing a control signal for the clock divider, and a non-volatile register storing a default value which copied into the volatile register.

Further in accordance with a preferred embodiment of the present invention, the "select microprocessor" signal is stored in a register which is loaded by a specific instruction performed by the execution unit.

Still further in accordance with a preferred embodiment of the present invention, the "select microprocessor" signal is stored in a register which is mapped as a memory location such that the "select microprocessor" signal is introduced therein by writing.

Additionally in accordance with a preferred embodiment of the present invention, the "select microprocessor" signal is stored in a non-volatile register which is loaded by programming.

Further in accordance with a preferred embodiment of the present invention, the apparatus also includes a volatile register storing the "select microprocessor" signal, and a non-volatile register storing a default value which is copied into the volatile register.

There is also provided, in accordance with another preferred embodiment of the present invention, a tamper-resistant execution device operative to execute instructions arriving from an instruction register, the device including an execution unit receiving and carrying out instructions received from the instruction register, a tamper attempt detector operative to detect attempts to tamper with the device, and an instruction replacement module intermediate the instruction register and the execution unit and operative, upon receipt of a "tamper attempt detected" input from the detector, to override instructions arriving from the instruction register with other instructions.

There is further provided, in accordance with another preferred embodiment of the present invention, a method for performing a robust conditional jump including testing the contents and the integrity of a condition signal within a single machine cycle, jumping to a first location if the condition signal indicates that the integrity of the condition is not maintained, jumping to a second location if the condition signal indicates that the integrity of the condition is maintained and the condition is fulfilled, and jumping to a third location if the condition signal indicates that the integrity of the condition is maintained and the condition is not fulfilled.

There is further provided, in accordance with another preferred embodiment of the present invention, memory access apparatus including a pseudo-random access delay signal generator generating an access delay signal which is at least pseudo-random and which determines the number of clock cycles to elapse from a memory access instruction clock cycle to actual memory access, and a memory access unit receiving the access delay signal and operative to access the memory after the number of clock cycles has elapsed.

Further in accordance with a preferred embodiment of the present invention, the pseudo-random signal generator includes a random signal generator.

Still further in accordance with a preferred embodiment of the present invention, the number of clock cycles allowed for memory access, once memory access has initiated, is programmable.

Further in accordance with a preferred embodiment of the present invention, the range of the random/pseudo-random access delay signal is programmable.

Still further in accordance with a preferred embodiment of the present invention, the number of cycles allocated to machine memory access is programmable.

BRIEF DESCRIPTION OF THE DRAWINGS

The present invention will be understood and appreciated from the following detailed description, taken in conjunction with the drawings in which:

FIG. 8A is a prior art timing diagram for access to memory;

FIG. 8B is a preferred timing diagram, provided in accordance with a preferred embodiment of the present invention, for access to memory.

Figure 2:
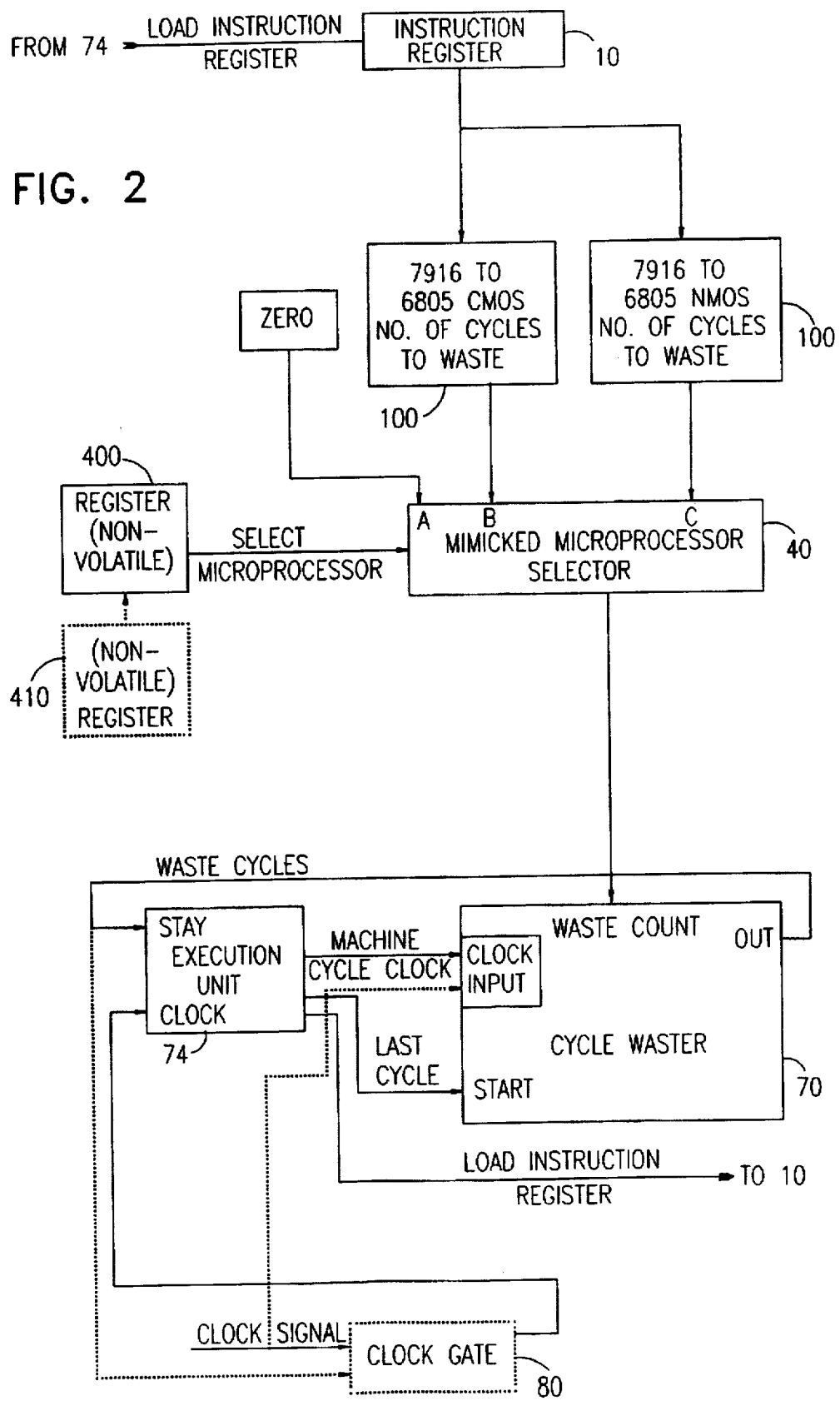
FIG. 2 is a simplified functional block diagram of a more optimized variation of the apparatus of FIG. 1.

Attached herewith is the following appendix which aid in the understanding and appreciation of one preferred embodiment of the invention shown and described herein:

Appendix A is a listing of a suitable program which performs the functions of the tables and selector of FIG. 2.

Alternative or optional implementations of the present invention are illustrated in the drawings by a "dotted line".

DETAILED DESCRIPTION OF A PREFERRED EMBODIMENT

Figure 1:
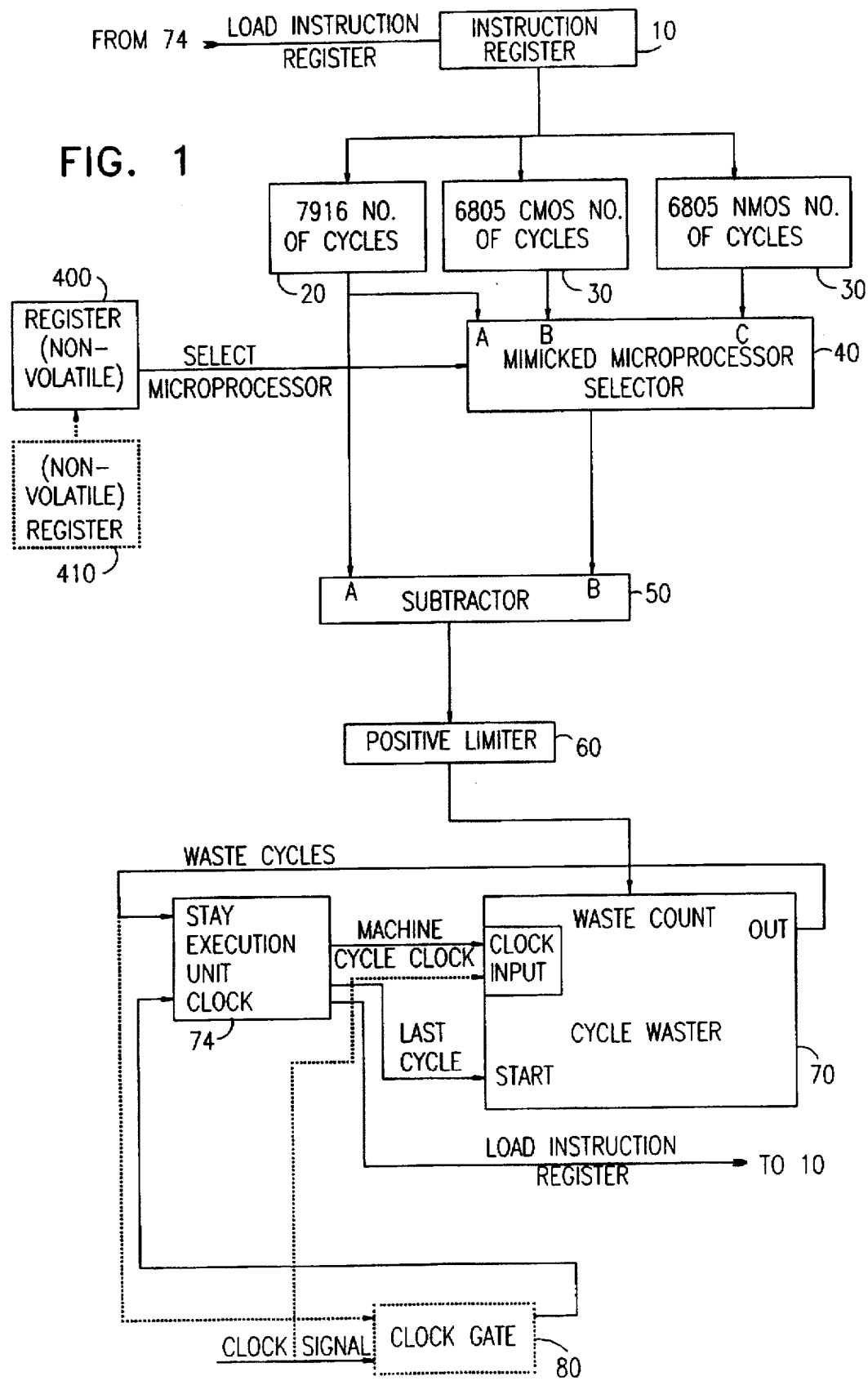
FIG. 1 is a simplified functional block diagram of a peripheral unit for a microprocessor constructed and operative in accordance with a preferred embodiment of the present invention.

Reference is now made to FIG. 1 which is a simplified functional block diagram of a peripheral unit for a microprocessor device, also termed herein "the 7916 device", which interacts with the execution unit of the 7916 device. The peripheral unit of FIG. 1 enables the 7916 device to mimic an existing microprocessor device, or alternatively a selected one of a plurality of existing microprocessor devices, the peripheral unit being constructed and operative in accordance with a preferred embodiment of the present invention.

The apparatus of FIG. 1 includes a conventional instruction register 10 feeding into a plurality of tables including a first table 20 storing the number of machine cycles required for each instruction by the microprocessor device itself. The plurality of tables also includes one or more second tables 30 which store the number of machine cycles required for each instruction by other existing microprocessor devices or microprocessor device families which perform at least some of the same instructions as does the microprocessor of FIG. 1. In the illustrated embodiment, the existing microprocessors which are supported are the Motorola 6805 CMOS microprocessor family and the Motorola 6805 NMOS microprocessor family.

In each table, the number of machine cycles stored for an instruction which the microprocessor device described by that table does not perform, is zero.

The tables are addressed by the instruction register 10 which indicates the instruction currently being executed.

Selection of the mimicked device is performed by a multiplexer 40 which receives a control signal. The multiplexer 40 selects the output of the table representing the device to be mimicked based on the control signal and feeds this data into a subtractor 50 which subtracts from this value the number of machine cycles of the 7916 device arriving directly from table 20.

The output of the subtractor is provided to a positive limiter 60 which zeros input values which are negative.

The output of the limiter 60 is provided to a cycle waster 70 which receives three control inputs. The first control input indicates the last cycle of the current instruction. The second control input indicates the machine cycle clock. Cycle wasting is counted by an internal counter, "count". The third control input, waste count, indicates the number of cycles to wait. Upon each wasted cycle, typically during the rising edge of the "machine cycle clock" control signal, "count" is decremented. Cycle wasting is initiated upon receipt of the "last cycle" input and continues until "count" reaches 0. The output of the cycle waster 70 is a "waste cycles" signal.

A preferred mode of operation for the cycle waster 70 is as follows:

```
IF (STARTED AND CLOCK) {
    IF (COUNT <> 0) {
        OUT = WASTE_COUNT
        COUNT = COUNT − 1
    }ELSE {
        STARTED = FALSE
        OUT = CONTINUE
    }
}
```

Preferably, the "waste cycles" signal instructs the execution unit 74 of the 7916 device, typically comprising a state machine or a microcode controller and associated microcode, to remain in its current state. Alternatively, a clock gate 80 may be provided and the "waste cycle" signal may instruct the clock gate 80 to block the clock to the execution unit, in which case the clock signal is fed directly into the cycle waster 70 and the tables 20 and 30 store the number of clock cycles required for each instruction. This alternate implementation is illustrated by the "dotted line" in FIGS. 1 and 2.

According to still a further alternative, the "waste cycles" signal may instruct the execution unit to perform one or more operations which have no net effect. For example, the execution unit may be instructed to carry out a NOP operation.

It is appreciated that the apparatus of FIG. 1 may be retrofitted to a conventional microprocessor device such as, for example, the DS80C320 which is an optimized faster version of the Intel 80C32, thereby to render the conventional microprocessor device capable of mimicking other existing devices. For example, the DS80C320 may, by virtue of the present invention, be rendered capable of mimicking the Intel 80C32 whereas, currently, the DS80C320 is incapable of mimicking the Intel 80C32 in timing-critical situations.

Reference is now made to FIG. 2 which is a more optimized variation of the apparatus of FIG. 1. FIG. 2 is similar to FIG. 1 except that the tables 20 and 30, subtractor 50 and positive limiter 60 are replaced by tables 100 which correspond in number to the number of existing microprocessors supported by the 7196 device. Each table 100 stores, for each instruction in the instruction register 10, the number of cycles to be wasted, typically the difference between the number of cycles required by the 7916 device and by the existing microprocessor.

The 7916 device does not have a table and therefore the table 20 input to the selector 40 in FIG. 1 is replaced by a zero input in FIG. 2.

According to a preferred embodiment of the present invention, the functions of tables 100 and selector 40 in FIG. 2 are replaced by a program based on Boolean equations representing these functions. Appendix A is a listing of a suitable program which performs the functions of tables 100 and selector 40. The program of Appendix A is written in Verilog language which is suitable for silicon design. It is appreciated that the particular embodiment described in Appendix A is intended only to provide an extremely detailed disclosure of the present invention and is not intended to be limiting.

Figure 3:
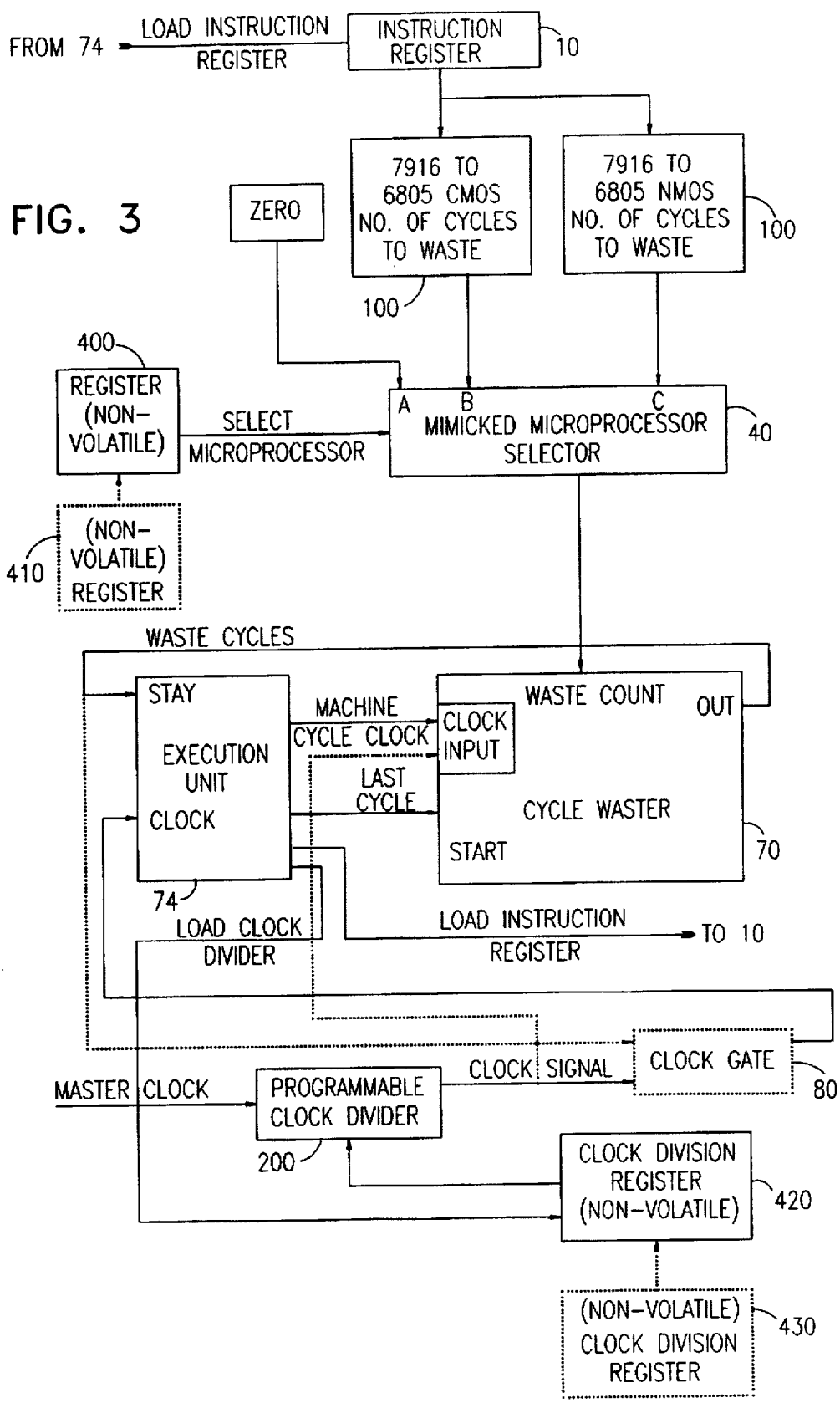
FIG. 3 is a simplified block diagram of a peripheral unit which is a modification of the apparatus of FIG. 2, having a repeatedly programmable master clock divider.

Reference is now made to FIG. 3 which is a simplified block diagram of a peripheral unit which is a modification of the apparatus of FIG. 2. The peripheral unit of FIG. 3 is generally similar to the peripheral unit of FIG. 2. However, the apparatus of FIG. 3 additionally comprises a repeatedly programmable master clock divider 200 which is operative to divide the master clock signal governing the execution unit 74 of the associated microprocessor.

A particular feature of the present invention is that the master clock divider 200 is controlled by the execution unit 74, via clock division register 420, during operation thereof, as indicated by the "load clock divider" input signal. Provision of the peripheral unit of FIG. 3 facilitates emulation of existing microprocessors by allowing the clock division thereof to be emulated in addition to emulation of the number of machine cycles per instruction which is provided in both FIGS. 2 and 3.

The advantage of the apparatus of FIG. 3 over the apparatus of FIG. 2 is apparent, for example, in applications in which a program developed for an existing microprocessor is to be mimicked and the timing of a portion of that program must be accurately mimicked. The timing of the remainder of the same program need not be accurately mimicked. The apparatus of FIG. 3 allows the user to employ a first clock division during the "timing-accurate" portion of the program, whereas, during the remainder of the program, a second clock division may be employed which may provide other advantages such as higher speed or less current consumption at lower speed.

It is appreciated that the clock divider of FIG. 3 may, similarly, be provided in conjunction with the embodiment of FIG. 1.

The embodiments of FIGS. 1 and 2 are suitable for applications in which it is sufficient to mimic the number of machine cycles and in which timing is not critical so that it is not necessary to exactly mimic the number of clock cycles.

The embodiments of FIGS. 1 and 2 may be used for timing-critical applications if the machine cycle clock feeding into the cycle waster 70 is replaced by the clock signal arriving from clock 80 and tables 20, 30, of FIG. 1 and tables 100, of FIG. 2, store the number of clock cycles to be wasted.

Figure 4:
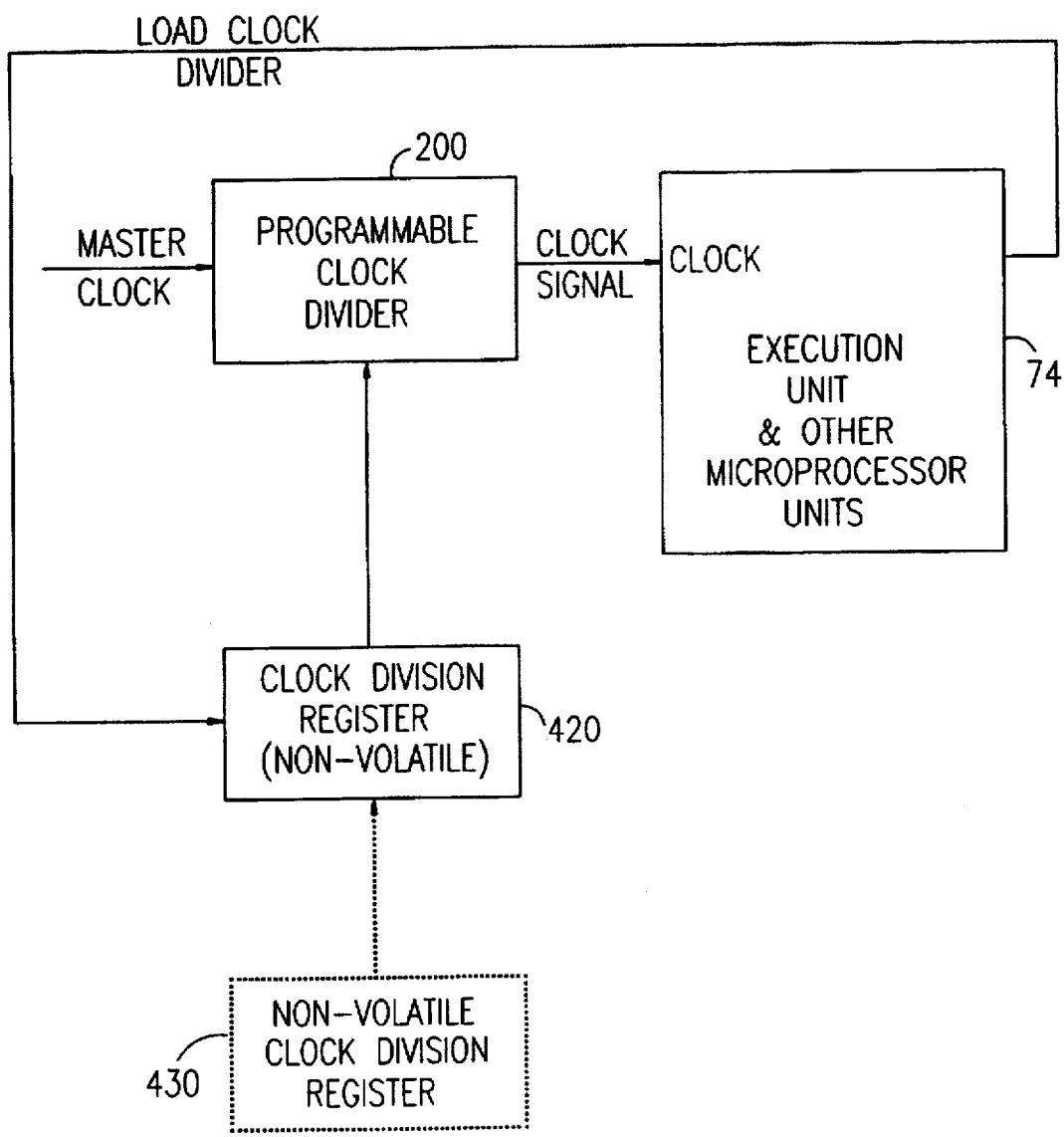
FIG. 4 is a simplified block diagram of a microprocessor constructed and operative in accordance with a preferred embodiment of the present invention having the programmable clock division feature of FIG. 3, without the cycle wasting feature of FIG. 2.

Reference is now made to FIG. 4 which is a microprocessor constructed and operative in accordance with a preferred embodiment of the present invention. The apparatus of FIG. 4 provides the programmable clock division feature of Fig. 3, however, the cycle wasting feature of FIGS. 1 and 2 are omitted.

The programmable clock division feature of FIG. 4, whether provided stand-alone or in combination with the cycle wasting feature of FIGS. 1 and 2, allow a programmer to vary the processing speed of his microprocessor. This is particularly useful in applications when power consumption considerations are important. Also, when using slow external peripherals, the apparatus of FIG. 4 allows the programmer to work at a slow speed only while using the slow peripherals and to work at a higher speed otherwise.

The "load clock divider" signal in FIGS. 3 and 4 may either be derived by decoding a special load instruction or by decoding a memory address in which the desired clock divider resides.

In FIGS. 3 and 4, the control of the clock divider 200 by the execution unit of the microprocessor may either be direct, as illustrated in FIGS. 3 and 4, or indirect, as via a suitable automation (not shown). Also, the divided clock signal may be fed into the execution unit either directly or indirectly.

The clock division may be one-time programmable in a non-volatile register, either by the manufacturer or by the user. Alternatively, the clock division may be programmable during execution time.

Similarly, the mimicked device selector 40 of FIGS. 1 and 3 may be one-time programmable in a non-volatile register, either by the manufacturer or by the user. Alternatively, the mimicked device selector may be programmable during execution time.

It is appreciated that the specific microprocessors mentioned herein are mentioned merely by way of example and are not intended to limit the applicability of the present invention to those particular microprocessors.

It is appreciated that the execution unit may control division of the master clock signal either directly, as illustrated in FIGS. 3 and 4, or indirectly, as via a suitable automation.

Figure 5:
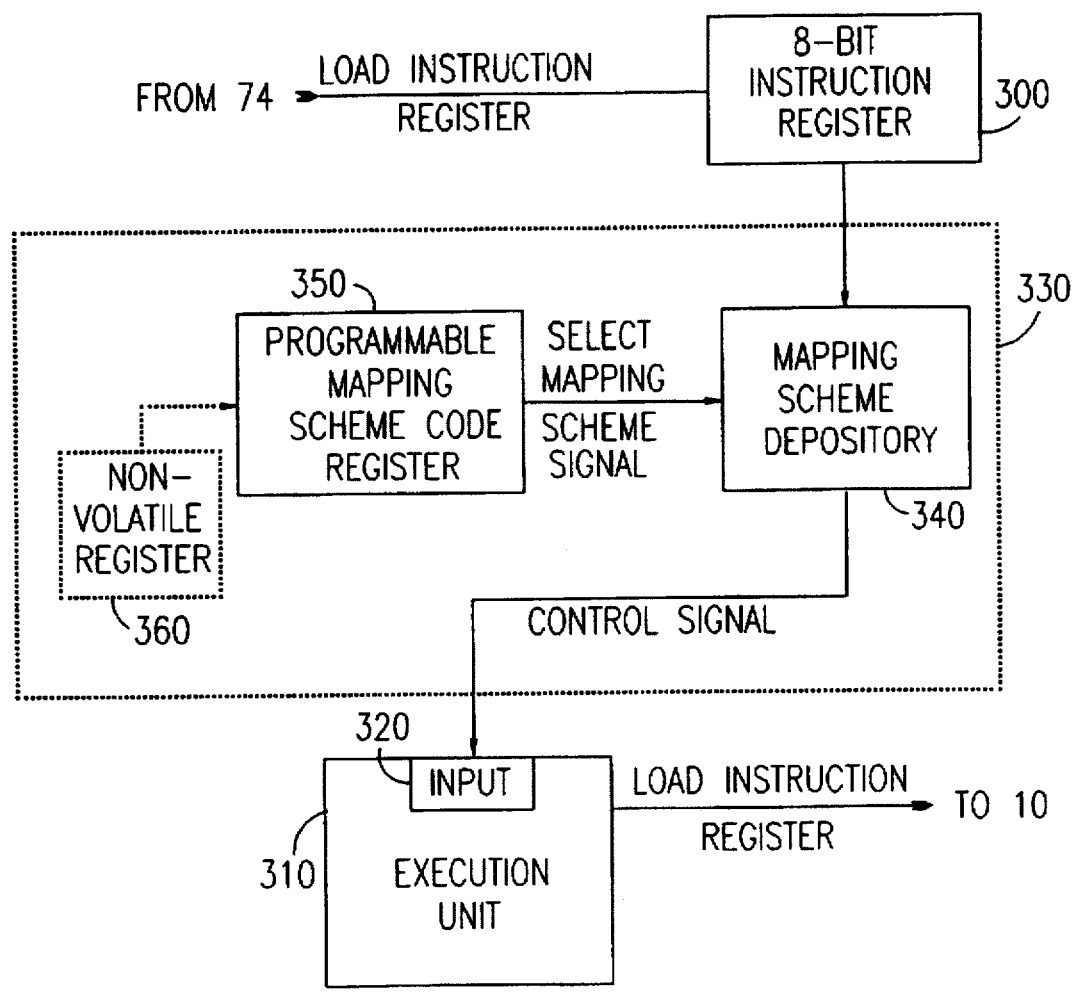
FIG. 5 is a simplified block diagram of microprocessor control apparatus employing a selected mapping scheme, which is constructed and operative in accordance with a preferred embodiment of the present invention.

Reference is now made to FIG. 5 which is a simplified block diagram of microprocessor control apparatus constructed and operative in accordance with a preferred embodiment of the present invention.

The apparatus of FIG. 5 includes an instruction register 300 receiving an individual one of a plurality of instruction codes.

An intrinsic instruction execution unit 310 contains a plurality of intrinsic instruction functions and an input 320. The execution unit 310 is operative to receive a control signal through the input 320 which designates an individual one of the intrinsic instruction functions. The designated intrinsic function is executed by the execution unit 310.

A programmable instruction mapper 330 is operative to employ a selected mapping scheme to convert the instruction code in the register into an intrinsic instruction designation which is provided as a control signal to the input 320 of the execution unit 310.

The programmable instruction mapper 330 comprises a mapping scheme depository 340 storing a multiplicity of mapping schemes and a programmable mapping scheme code register 350 which provides a control signal comprising the code of the mapping scheme which the depository is to employ.

The number of possible mapping schemes for 8-bit instruction codes is 256!. Typically, a subset of the 256! mapping schemes are provided. For example, only two mapping schemes may be provided, of which one is the "neutral" mapping scheme in which each bit is mapped onto itself and the other mapping scheme is a bit permutation followed with an inversion of some of the bits, such as the third and fifth bits.

A preferred VERILOG program for utilizing the "select mapping scheme" signal to assign a new instruction code in accordance with the selected mapping scheme is as follows:

```
always @(irx)
    being
        being
            if (InOeMUL)
                ir = irx;
            else
                ir={ irx[0],irx[3],irx[4],irx[7],irx[2],irx[5],irx[6],irx[1] }
                ^   8'hasS;
        end
end
```

In the above sample block, the 'irx' signal arriving from the instruction register 300 is assigned to 'ir' signal when the mapping scheme is neutral. When the bit permutation mapping scheme is activated, 'irx' is permuted and some its bits are inverted by the XOR operation, designated in VERILOG with a "^".

Figure 6:
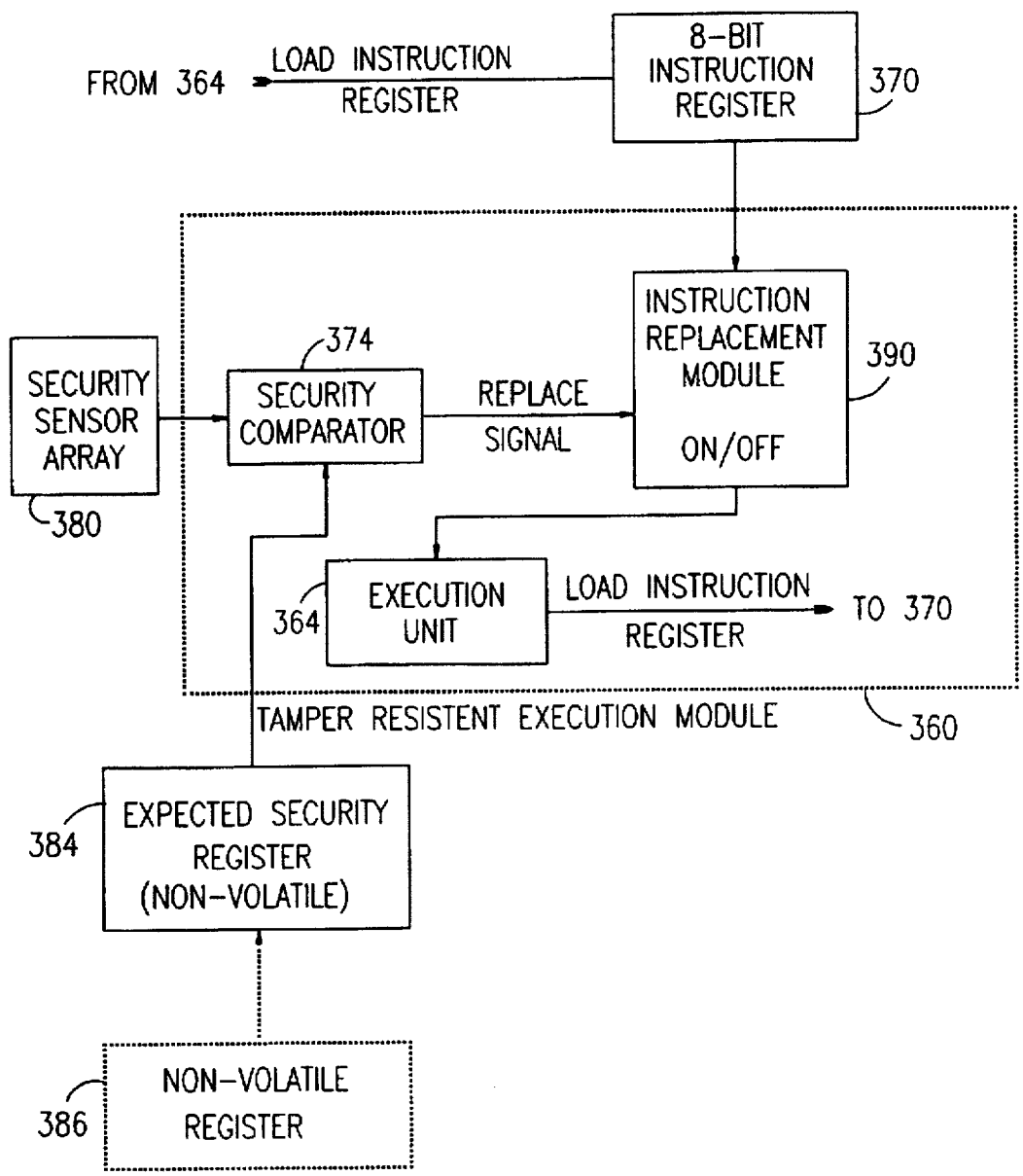
FIG. 6 is a simplified block diagram of microprocessor control apparatus which includes a tamper-resistant execution module 360.

FIG. 6 is a simplified block diagram of microprocessor control apparatus which includes a tamper-resistant execution module 362. The tamper-resistant execution module 362 includes an execution unit 364 which performs an instruction corresponding to an instruction code arriving from an instruction register 370, via the instruction replacement module 390, whose function is described hereinbelow.

A security comparator 374 is operative to receive input from a security sensor array 380 which is operative to detect tampering attempts. The security sensor array 380 may include any suitable type of sensor such as but not limited to one or more of the following sensor types in any suitable location within the microprocessor: light detector; temperature detector; voltage-out-of-range detector, clock frequency out-of-range detector.

The security comparator 374 compares the input arriving from each sensor of the security sensor array 380 to an expected state signal representing the expected state for that sensor. The "expected state" signal may be stored in an expected state register 384 which, optionally, is associated with a non-volatile register 386 whose function is described in detail below.

For each sensor, the "expected state" signal may have only two values, corresponding to "no tampering" and "tampering detected". Optionally, the "expected state" signal may also have a third value, indicating that the input from that sensor should be enabled or disabled.

The security comparator 374 is operative to provide a "tamper detect" signal, indicating whether or not a tampering attempt has been detected, to an instruction replacement module 390. Typically the "tamper detect" signal indicates a tampering attempt if any one of the enabled sensors is not in its expected state.

The instruction replacement module 390 is enabled if a tampering attempt has been detected and is disabled otherwise. When enabled, the instruction replacement module 390 is operative to override the instruction arriving from instruction register 370 with an overriding instruction. Preferably the overriding instruction is not a load instruction so as to prevent secure information stored in microprocessor memory from traveling over the internal busses where it could be picked up by the tampering party. The overriding instruction may, for example, be a jump instruction.

According to the illustrated embodiment, the overriding instruction continues to be fed into the execution unit 364 by the instruction replacement module 390 until the security comparator 374 indicates that there is no longer any tampering attempt.

Preferably, the security comparator 374 and the instruction replacement module 390 are provided within a single module 362, as shown. Alternatively, the security comparator and/or the instruction replacement module need not be provided in the same module as execution unit 364.

A preferred VERILOG program for comparing the expected state of the security sensors to their actual state and for jamming the instruction input to the execution unit if the comparison yields a discrepancy is as follows:

```
always @(irx or security or ExpectedSecurityState)
  begin
    if (Security == ExpectedSecurityState)
      ir = irx;
    else
      ir = (irx ^ 8'h20) & 8'h20;
  end
```

The above block compares the output of security sensor 380 to the Expected Security State stored in register 384. If a match is found, the output of the instruction register 370, "irx", is mapped into an 'ir' output signal which is later fed to the execution unit. In case of a mismatch, all bits of the instruction except bit 6 are forced to zero by means of the AND operation, designated "&" in VERILOG. Bit 6 is inverted by a XOR operation, designated "^" in VERILOG, resulting in two possible instruction codes 8'h00 or 8'h20 which are relative jump instructions for the 6805 microprocessor.

The "expected state" signal for security comparator 374 may be introduced into register 384 in any suitable manner, such as the following:

a. The input signal may be introduced into register 384 by means of a specific instruction performed by the execution unit;

b. The register 384 may be regarded as a memory location so that the input signal may be introduced therein by writing.

c. The register 384 may be non-volatile and the input signal may be programmed into the register by programming apparatus or by the microprocessor itself, if it is self-programming.

d. The register 384 may be volatile and an additional, non-volatile register 386 may be provided, as shown by the "dotted line" of the preferred embodiment of FIG. 6. The initial state of volatile register 384 may be determined by copying the value stored in the non-volatile register 386, either during power-up or during the reset sequence.

The registers 384 and 386 may be regarded as memory locations so as to allow the contents of register 384 to be copied into register 386 by means of standard read/write instructions, without resetting.

It is appreciated that the above methods a.–d. for introducing an input signal into a register are also applicable to the input signal for mimicked device selector 40 of FIGS. 1–3.

A suitable register and the non-volatile register required for option d are referenced 400 and 410, respectively in FIGS. 1–3.

It is appreciated that the above methods a.–d. for introducing an input signal into a register are also applicable to the load clock divider signal for programmable clock divider 200 of FIGS. 3–4. For this purpose, a suitable register and the non-volatile register required for option d are referenced 420 and 430, respectively in FIGS. 3–4.

It is appreciated that the above methods a.–d. for introducing an input signal into a register are also applicable to the "select mapping scheme" signal for mapping scheme depository 340 of FIG. 5. For this purpose, a suitable register and the non-volatile register required for option d are referenced 350 and 360, respectively in FIG. 5.

Figure 7:
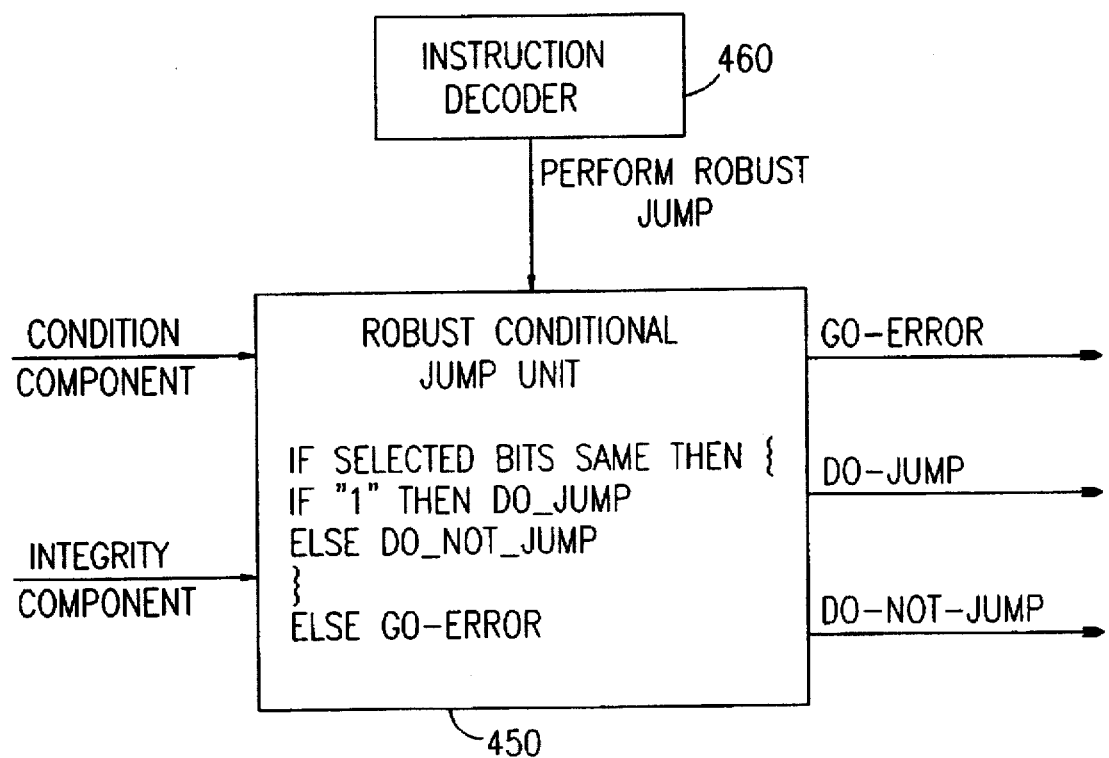
FIG. 7 is a simplified block diagram of a jump unit constructed and operative in accordance with a preferred embodiment of the present invention which is operative to perform a robust conditional jump.

FIG. 7 is a simplified block diagram of a jump unit constructed and operative in accordance with a preferred embodiment of the present invention which is operative to perform a robust conditional jump.

The apparatus of FIG. 7 includes a conditional jump unit 450 which is operative in response to an actuating "perform robust conditional jump" signal received from an instruction decoder 460.

A composite condition signal is received from a suitable source (not shown), either internal or external. The composite condition signal includes a condition component which determines the jump and an integrity component which allows the integrity of the composite condition signal to be verified. For example, the integrity component may include a copy of the condition component and/or may include the 1's complement of the condition component and/or may include humming error detection code or any other suitable error detection code. The complexity of the integrity component depends on the required degree of confidence in the integrity of the composite condition signal.

The jump unit 450 is operative to perform the following operations:

a. testing the contents and the integrity of the composite condition signal within a single machine cycle;

b. jumping to a first location (go_error) if the condition signal indicates that the integrity of the condition is not maintained;

c. jumping to a second location (do_jump) if the condition signal indicates that the integrity of the condition is maintained and the condition is fulfilled; and d. jumping to a third location, such as, for example, the immediately following location instruction (do_not_jump) if the condition signal indicates that the integrity of the condition is maintained and the condition is not fulfilled.

A particular feature of the apparatus of FIG. 7 is that the jump location is determined within the same cycle as the integrity check such that it is impossible for the composite condition component signal to lose its integrity after the integrity check and before the jump location is determined.

A preferred VERILOG program for performing a robust jump is as follows:

```
always @(ConditionBits or ConditionGuardBits or RequestedJump)
  begin
    DoJump = 1'h0;        //Assume no Jump
    DoNotJump = 1'h0;
    GoError = 1'h0;       //Assume no error.
    if (ConditionBits == ConditionGuardBits)
      begin
        if (ConditionBits[RequestedJump] == 1'h1)
          DoJump = 1'h1;
        else
          DoNotJump = 1'h1;
      end
    else
      GoError = 1'h1;
  end
```

In the above program, the condition bits are compared with the integrity component bits which is the one's complement, designated in VERILOG by the "~" operator. If the condition is intact, a requested bit is checked and a decision to Jump or not to Jump is reached. Should the condition prove not intact, a GoError signal is activated to inform the outside world of a data integrity problem and no jump is performed.

Figure 9:
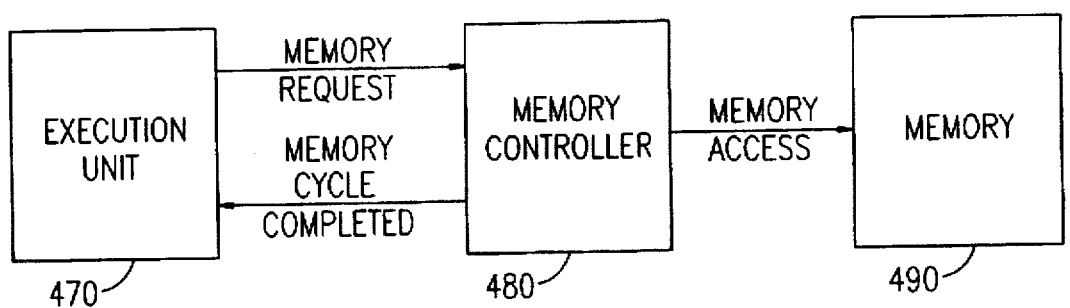
FIG. 9 is a very generalized prior art block diagram of a microprocessor which is useful in understanding the notations of FIGS. 8A and 8B.

FIG. 8A is a prior art timing diagram for access to memory of any of the execution units of FIGS. 1–6, or of the microprocessor illustrated generally in FIG. 9. The DS80C320 chip has a stretch memory cycle feature whereby the duration of the memory access signal, "access time", is programmable.

In FIG. 8A, there is no delay between the memory request signal to the memory access signal. In some state of the art multiprocessors, there is a delay (not shown) if the memory is busy due to access by another microprocessor.

FIG. 8B is a preferred timing diagram for access of any of the execution units of FIGS. 1–6 to memory. It is appreciated that the applicability of the timing diagram of FIG. 8B is not limited to the embodiments of FIGS. 1–6, but rather is suitable for any general microprocessor, including an execution unit 470, a memory controller 480 and a memory 490, as illustrated in prior art FIG. 9.

The timing diagram of FIG. 8B illustrates a delay between the memory request to the memory access whose duration, "delay time", is preferably pseudo-random or even random. Preferably, the range of the pseudo-random or random delay duration is programmable. Preferably, the duration of the memory access signal, "access time" is also programmable.

The memory cycle time is measured from the initiation of the memory request signal to the termination of the memory cycle completion signal supplied to the execution unit 470 by the memory controller 480 (as demonstrated by the prior art embodiment of FIG. 9). Preferably, the memory cycle time is programmable. In this case, there is typically a second delay period extending from termination of the memory access signal to the beginning of the memory cycle completion signal. The length of the second delay period is the user-selected duration of the memory cycle, minus the sum of the duration of the memory request signal, the pseudo-random/random delay time, the access time, and the duration of the memory cycle completed signal.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

| Page - 1/5 | APNDX-A.DOC | 14/06/94 05:18 PM |

```
1   module cycles (
2      // outputs
3   //     DeltaCycles,
4         CyclesDone,
5
6      // inputs
7         SuperCycles,
8         MimicHMOS,
9         CountDown,
10        mcp,
11        ir,
12        mrsn
13  );
14  // output[2:0] DeltaCycles;
15  reg[2:0] DeltaCycles, DeltaCyclesX, DCyclesA,
16  DCyclesB;
17  output CyclesDone;
18  reg CyclesDone, PreCyDone, CyclesStart;
19
20  input SuperCycles, MimicHMOS, CountDown, mcp,
21  mrsn;
22  input [7:0] ir;
23
24  wire [3:0] IRH = ir[7:4];
25  wire [3:0] IRL = ir[3:0];
26
27  wire BTB6  = (IRH == 4'h0);
28  wire BSC3  = (IRH == 4'h1);
29  wire REL2  = (IRH == 4'h2);
30  wire DIR2  = (IRH == 4'h3);
31  wire IHA2  = (IRH == 4'h4);
32  wire IHX2  = (IRH == 4'h5);
33  wire IX13  = (IRH == 4'h6);
34  wire IX23  = (IRH == 4'h7);
35  wire IX123 = IX13 | IX23;
36
37  wire INH82 = (IRH == 4'h8);
38  wire INH90 = (IRH == 4'h9);
39  wire IMM0  = (IRH == 4'ha);
40  wire DIR1  = (IRH == 4'hb);
41  wire EXT1  = (IRH == 4'hc);
42  wire HX22  = (IRH == 4'hd);
```

```
43   wire HX12   = (IRH == 4'he);
44   wire HXX2   = (IRH == 4'hf);
45   wire DIREXT1 = DIR1 | EXT1;
46   wire HX122  = HX22 | HX12;
47   wire HX12X2 = HX122 | HXX2;
48
49   wire RTIL  = (IRL == 4'h0);
50   wire RTSL  = (IRL == 4'h1);
51   wire SWIL  = (IRL == 4'h3);
52   wire STAL  = (IRL == 4'h7);
53   wire JMPL  = (IRL == 4'hc);
54   wire RSPL  = JMPL;
55   wire TSTL  = (IRL == 4'hd);
56   wire BSRL  = TSTL;
57   wire NOPL  = TSTL;
58   wire STOPL = (IRL == 4'he);
59   wire CLRL  = (IRL == 4'hf);
60   wire STXL  = CLRL;
61   wire WAITL = CLRL;
62
63   wire TSTCLRL = TSTL | CLRL;
64   wire STASTXL = STAL | STXL;
65   wire RTIRTSL = RTIL | RTSL;
66   wire RSPNOPL = RSPL | NOPL;
67   wire SJJS = STAL | JMPL | BSRL | STXL;
68   wire SXJS = STAL | BSRL | STXL;
69
70   wire MUL0 = (ir == 8'h42);
71
72   always @(SuperCycles or ir or MimicHMOS)
73     begin
74       if (SuperCycles) DeltaCyclesX = 3'h0;
75
76       else begin
77         if (MimicHMOS)
78         begin
79           // Most instructions are one cycle more
80   efficient
81           DeltaCyclesX = 3'h1;
82
83           // 2 cycles more efficient:
```

| Page - 3/5 | APNDX-A.DOC | 14/06/94 05:18 PM |

```
84           if (REL2 || (DIR2 && !TSTCLRL) || (IHA2 &&
85   !MUL0) || IHX2 ||
86           (INH82 && (RTIRTSL || SWIL)) || (DIREXT1
87   && STASTXL) || (HX12X2 && !SJJS) ||
88           (HX122 && JMPL))
89           DeltaCyclesX = 3'h2;
90
91         // 3 cycles more efficient:
92         else if (BSC3 || (DIR2 && TSTCLRL) ||
93   (IX123 && !TSTCLRL) || (DIREXT1 && BSRL) ||
94           (HX12X2 && STASTXL) || (HXX2 && BSRL))
95           DeltaCyclesX = 3'h3;
96
97         // 4 cycles more efficient:
98         else if ((IX123 && TSTCLRL) || (IMM0 &&
99   BSRL) || (HX122 && BSRL))
100          DeltaCyclesX = 3'h4;
101
102        // 6 cycles more efficient:
103        else if (BTB6)
104          DeltaCyclesX = 3'h6;
105
106        // 0 cycles more efficient:
107        else if (MUL0 || (INH82 && (STOPL ||
108  WAITL)) || (INH90 && !(RSPL || NOPL)) ||
109          (IMM0 && !SJJS))
110          DeltaCyclesX = 3'h0;
111      end
112
113      else
114      begin // Mimic CMOS
115        // Most instructions are one cycle more
116  efficient
117        DeltaCyclesX = 3'h1;
118
119        // 2 cycles more efficient:
120        if ((DIR2 && CLRL) || (IX123 && !CLRL) ||
121  (INH82 && RTIRTSL) || (IMM0 && BSRL) ||
122          (HX12X2 && STASTXL) || (HX122 && BSRL))
123          DeltaCyclesX = 3'h2;
124
125        // 3 cycles more efficient:
```

```
126            else if (IX123 && CLRL)
127               DeltaCyclesX = 3'h3;
128
129            // 0 cycles more efficient:
130            else if ((INH90 && !RSPNOPL) || (IMM0 &&
131 !BSRL) || (DIREXT1 && !SXJS) ||
132               (HXX2 && JMPL) || MUL0 || (INH82 &&
133 (STOPL || WAITL)))
134               DeltaCyclesX = 3'h0;
135         end
136      end
137   end
138
139 always @(PreCyDone or CyclesStart)
140   begin
141      if (PreCyDone == 1'b0)
142         CyclesDone = CyclesStart;
143      else
144         CyclesDone = 1'b1;
145   end
146
147 always @(DeltaCyclesX)
148    CyclesStart = ~(|DeltaCyclesX);
149
150 always @(DeltaCycles)
151    PreCyDone = ~(|DeltaCycles);
152
153 always @(CountDown or DeltaCyclesX or DeltaCycles)
154   begin
155      if (CountDown == 1'b0)
156         DCyclesA = DeltaCyclesX;
157      else
158         DCyclesA = DeltaCycles;
159   end
160
161 always @(DCyclesA)
162    DCyclesB = DCyclesA - 1;
163
164 wire clock = (mcp & CountDown);
165
166 always @(posedge clock or negedge mrsn)
167    begin
```

| Page - 5/5 | APNDX-A.DOC | 14/06/94 05:18 PM |

```
168       if (!mrsn)
169          DeltaCycles = 3'b111;
170       else
171          DeltaCycles = DCyclesB;
172    end
173
174 endmodule
175
```

I claim:

1. Memory access apparatus comprising:

a pseudo-random access delay signal generator generating an access delay signal which is at least pseudo-random and which determines the number of clock cycles to elapse from a memory access instruction clock cycle to actual memory access;

a memory access unit receiving said access delay signal and operative to access the memory after said number of clock cycles has elapsed; and an additional delay signal generator which is coupled to the memory access unit and is operative to generate delay signal extending from termination of said actual memory access to a beginning of a memory cycle completion signal.

2. Apparatus according to claim 1 wherein the pseudo-random signal generator comprises a random signal generator.

3. Apparatus according to claim 1 wherein the number of clock cycles allowed for memory access, once memory access has initiated, is programmable.

4. Apparatus according to claims 1 wherein the range of the at least pseudo-random access delay signal is programmable.

5. Apparatus according to claim 1 wherein the number of cycles allocated to machine memory access is programmable.

6. A microprocessor comprising:

a memory for storing data;

an execution unit which is operative to generate a memory request signal; and a memory controller
receiving the memory request signal from the execution unit, generating, in response to reception of the memory request signal, a first delay signal which is at least pseudo-random and which determines a first number of clock cycles to elapse from termination of the memory request signal, and accessing the memory after said first number of clock cycle elapses for generating, upon termination of actual memory access, a second delay signal which determines a second number of clock cycles to elapse from termination of the actual memory access, and for providing to said execution unit a memory cycle completed signal after said second number of clock cycles elapses, wherein said memory controller is coupled to the execution unit and to the memory.

7. A method for accessing a memory in a microprocessor having an execution unit and a memory controller which controls the memory, the method comprising:

generating, at the execution unit, a memory request signal;

providing the memory request signal to the memory controller;

generating at the memory controller, in response to reception of the memory request signal, a first delay signal which is at least pseudo-random and which determines a first number of clock cycles to elapse from termination of the memory request signal;

accessing the memory after said first number of clock cycles elapse, then generating a second delay signal which determines a second number of clock cycles to elapse from termination of said accessing step; and providing to said execution unit a memory cycle completed signal after said second number of clock cycles elapses.

* * * * *